(12) United States Patent
Lee

(10) Patent No.: US 6,920,444 B2
(45) Date of Patent: Jul. 19, 2005

(54) ACCESSING RELATIONAL DATABASE USING AN OBJECT-ORIENTED LANGUAGE

(75) Inventor: Jonathan M. Lee, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 718 days.

(21) Appl. No.: 09/965,259

(22) Filed: Sep. 26, 2001

(65) Prior Publication Data

US 2003/0061194 A1 Mar. 27, 2003

(51) Int. Cl.[7] .............................................. G06F 17/00
(52) U.S. Cl. .................................. 707/1; 707/3; 707/4
(58) Field of Search ........................... 707/1, 3, 4, 103, 707/10; 719/316, 330

(56) References Cited

U.S. PATENT DOCUMENTS

| | | | | |
|---|---|---|---|---|
| 5,721,910 A | | 2/1998 | Unger et al. .................. 395/611 |
| 5,732,257 A | * | 3/1998 | Atkinson et al. ............... 707/4 |
| 6,006,230 A | * | 12/1999 | Ludwig et al. ................ 707/10 |
| 6,393,497 B1 | * | 5/2002 | Arnold et al. ................ 719/330 |
| 6,663,188 B2 | * | 12/2003 | Sumi et al. ............... 301/37.33 |
| 6,757,747 B1 | * | 6/2004 | Hooper ........................ 719/316 |
| 6,803,927 B1 | * | 10/2004 | Sahoo ......................... 715/748 |
| 6,842,906 B1 | * | 1/2005 | Bowman-Amuah ......... 719/330 |

* cited by examiner

*Primary Examiner*—Sanjiv Shah
(74) *Attorney, Agent, or Firm*—Gunnison, McKay & Hodgson, L.L.P.

(57) ABSTRACT

The present invention provides for a proxy object that aids in returning a set of column names in a relational database. A predetermined method may be called which returns the proxy object, the proxy object representing a table in the relational database. The proxy object may be recursive, such that it may contain references to other proxy objects, as well as to column proxy objects, which represent individual columns in the database. Accessing the column proxy object then allows an object-oriented language program to retrieve a column name and therefore access individual columns in the relational database without forehand knowledge of the column names. The calls to the methods returning the proxy objects will typically never change, and if column names are changed, deleted, or added, these changes can be easily handled if a database provider maintains the column proxy object by having the database provider update the proxy object(s).

36 Claims, 8 Drawing Sheets

ACCESSING RELATIONAL DATABASE USING AN OBJECT-ORIENTED LANGUAGE

FIELD OF THE INVENTION

The present invention relates to tables and columns in a computerized database. More specifically, the present invention relates to accessing the tables and columns of a computerized database using an object-oriented representation.

BACKGROUND OF THE INVENTION

In many programming languages, the standard technique for accessing a database is to insert specialized statements into the program. Each specialized statement performs one of several predetermined actions on the database, such as reading from a particular entry, adding a new entry, etc. The most popular language utilized for relational databases is the Structured Query Language (SQL). SQL statements are therefore most often integrated into the code when programming in other programming languages.

FIG. 1 is a block diagram illustrating how typical object-oriented language programs access a SQL database. Each program 100a, 100b, 100c, 100d may incorporate SQL code into their programming. This SQL code then allows the programs 100a, 100b, 100c, 100d to directly access the SQL database 102. An example of such programming might be:

```
                [code to set up the connection]
Statement stmt =    conection.createStatement ();
String query =      "SELECT * " +
                    "FROM TEmployee" +
                    "WHERE TEmployee.getID() = '12345' ";
ResultSet    rs     = stmt.executeQuery (query);
```

This is an example using the Java™ object oriented programming language. As can be seen, SQL statements like "stmt.executeQuery(query)" are directly programmed into the code. This approach has many shortcomings, but these shortcomings are especially relevant when it comes to names of columns in SQL database tables. Researching column names can be difficult and time consuming. This is especially true when the database provider is a different company than that which employs the object-oriented language programmer. The object-oriented language programmer must then communicate with the database provider to learn the different column names. When a column name is changed or added to the database, each of the object oriented language programs accessing the database must be modified. Furthermore, even when all of these procedures are undertaken, programmers with both SQL and object-oriented language expertise are rare.

One solution to this problem might be to represent SQL grammar parts as objects within the object-oriented language programs. However, this approach does not allow for the representation of database tables, columns or names. Another approach might be to create object-oriented language databases as opposed to standard relational databases, storing data in objects instead of tables. This approach has several drawbacks, most notably that SQL databases are quite common and effective, and companies would be reluctant to change to an entirely different class of database. Thus, while object-oriented language databases exist, they are not popular for this reason.

Another potential solution would be to represent tables SQL data as a collection of objects, such as by using Java Data Objects (JDO™). JDO™ represents tables or views as Java classes, but the drawback is that it can't access anything lower than the Java class, and therefore it's not possible to handle column names.

What is needed is a solution which allows object-oriented language programs to access SQL column names without suffering the drawbacks of the prior art.

BRIEF DESCRIPTION OF THE INVENTION

The present invention provides for a proxy object that aids in returning a set of column names in a relational database. A predetermined method may be called which returns the proxy object, the proxy object representing a table in the relational database. The proxy object may be recursive, such that it may contain references to other proxy objects, as well as to column proxy objects, which represent individual columns in the database. Accessing the column proxy object then allows an object-oriented language program to retrieve a column name and therefore access individual columns in the relational database without forehand knowledge of the column names. The calls to the methods returning the proxy objects will typically never change, and if column names are changed, deleted, or added, these changes can be easily handled if a database provider maintains the column proxy object by having the database provider update the proxy object(s).

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
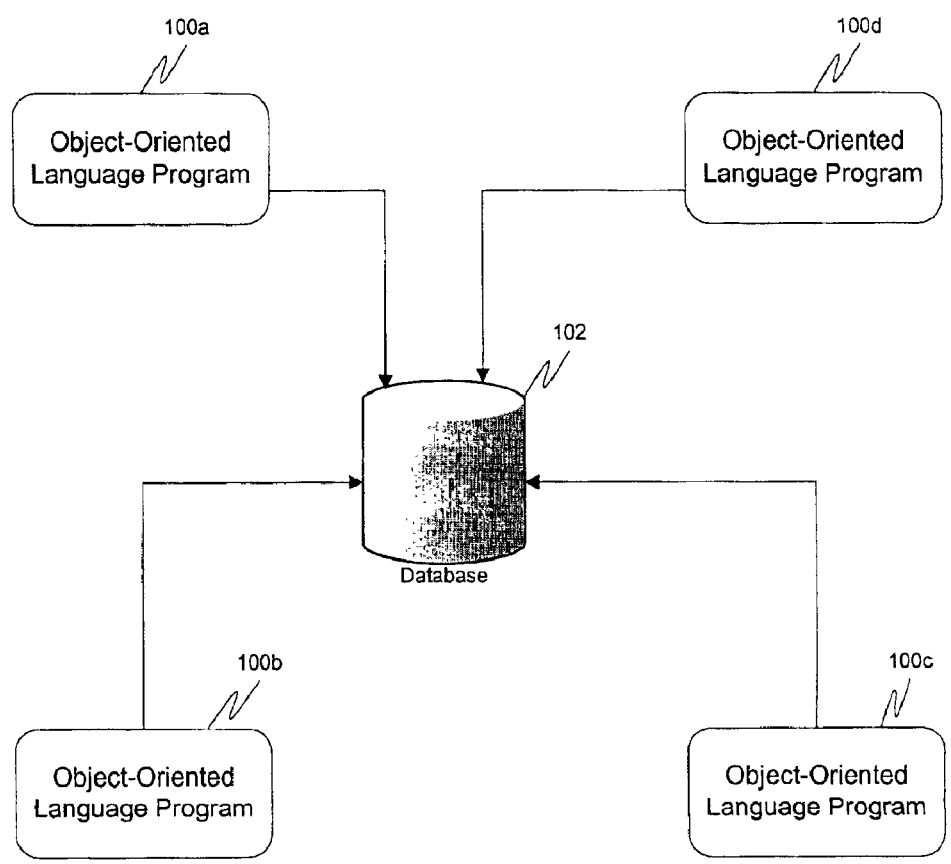
FIG. 1 is a block diagram illustrating how typical object-oriented language programs access a SQL database.

Embodiments of the present invention are described herein in the context of a system of computers, servers, communication mechanisms, and tags. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Throughout this specification, the term "structured query language" may be used. While SQL is currently the industry standard for structured query languages, one of ordinary skill in the art will recognize that the term "structured query language" should not be limited to SQL.

The present invention provides for a proxy object that represents a table in a relational database. The proxy object may contain references to one or more column proxy objects, each column proxy object representing a column in the corresponding table. The proxy object may then be maintained by the database provider (although it is not strictly necessary), thus allowing the object-oriented language program to call predetermined methods which return the proxy object and/or column proxy objects. The calls to these methods will typically never change, and if column names are changed, deleted, or added, these changes can easily be handled by having the database provider update the column proxy object or objects.

Views are combinations of tables or portions of tables. To the user, views are normally indistinguishable from other tables. Thus, one of ordinary skill in the art will recognize that the present invention may apply to views as well as tables. Additionally, while columns and column names are specifically discussed in the present application, a database table exists in a virtual realm, where the distinction between rows vs. columns and horizontal vs. vertical has little meaning. Thus, the present invention may equally apply to rows rather than columns.

Figure 2:
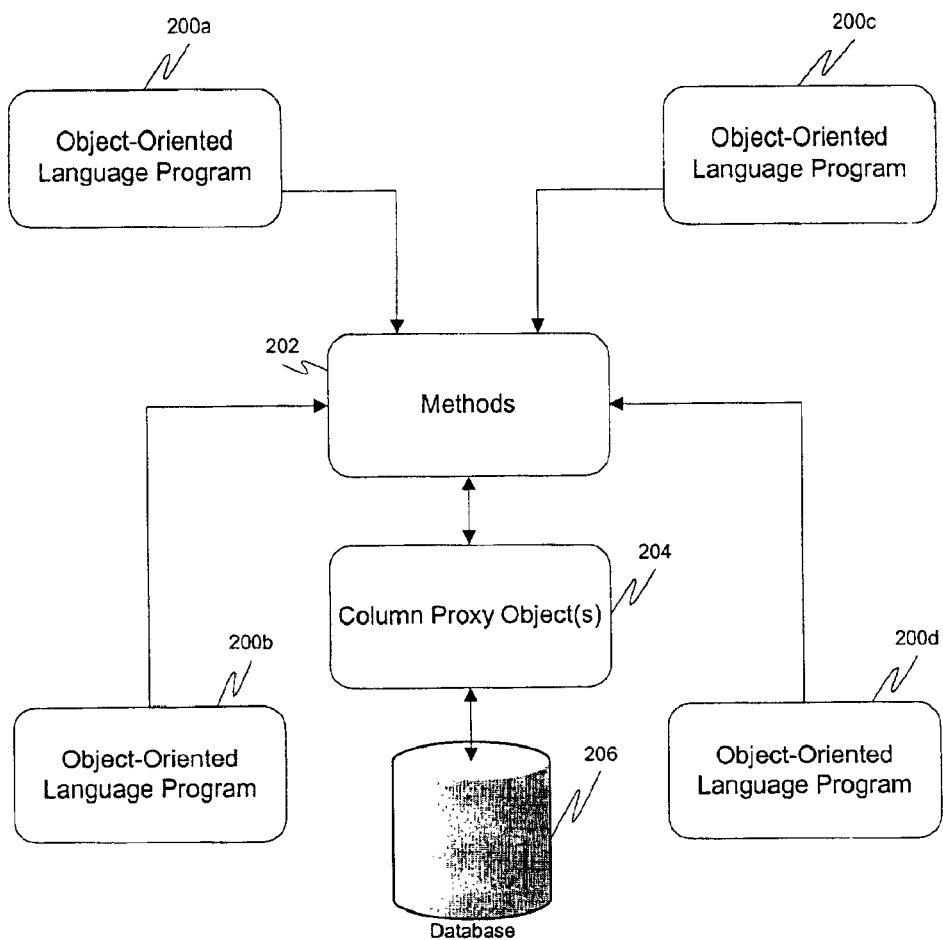
FIG. 2 is a block diagram illustrating the organization of a system of object-oriented language programs and a database in accordance with a specific embodiment of the present invention.

FIG. 2 is a block diagram illustrating the organization of a system of object oriented language programs and a database in accordance with a specific embodiment of the present invention. Object oriented language programs 200a, 200b, 200c, and 200d call a method or methods 202 which return a proxy object and/or column proxy objects 204, which may be maintained by the database provider and tied to database 204.

In a specific embodiment of the present invention, the methods 202 have standardized names, so that calling an appropriate method is easy for a programmer to accomplish. For example, if the table represents an employee file, there may be a class called "JEmployee" which then may contain a method "getID" corresponding to the category of employee identifications. Invoking employee.getID then returns the column proxy object representing the corresponding SQL column name for the column representing identifications.

Figure 3:
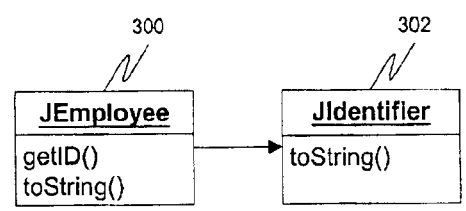
FIG. 3 is a diagram illustrating a simple example of the class hierarchy in the column proxy object in accordance with a specific embodiment of the present invention.

FIG. 3 is a diagram illustrating a simple example of the class hierarchy in the column proxy object in accordance with a specific embodiment of the present invention. JEmployee 300 contains two methods, getID( ), which returns the column proxy object representing the employee identification and the generic to String( ), which is used to return the column name corresponding to the selected column proxy object. JIdentifier 302, then represents the sub-class of identifiers.

Figure 4:
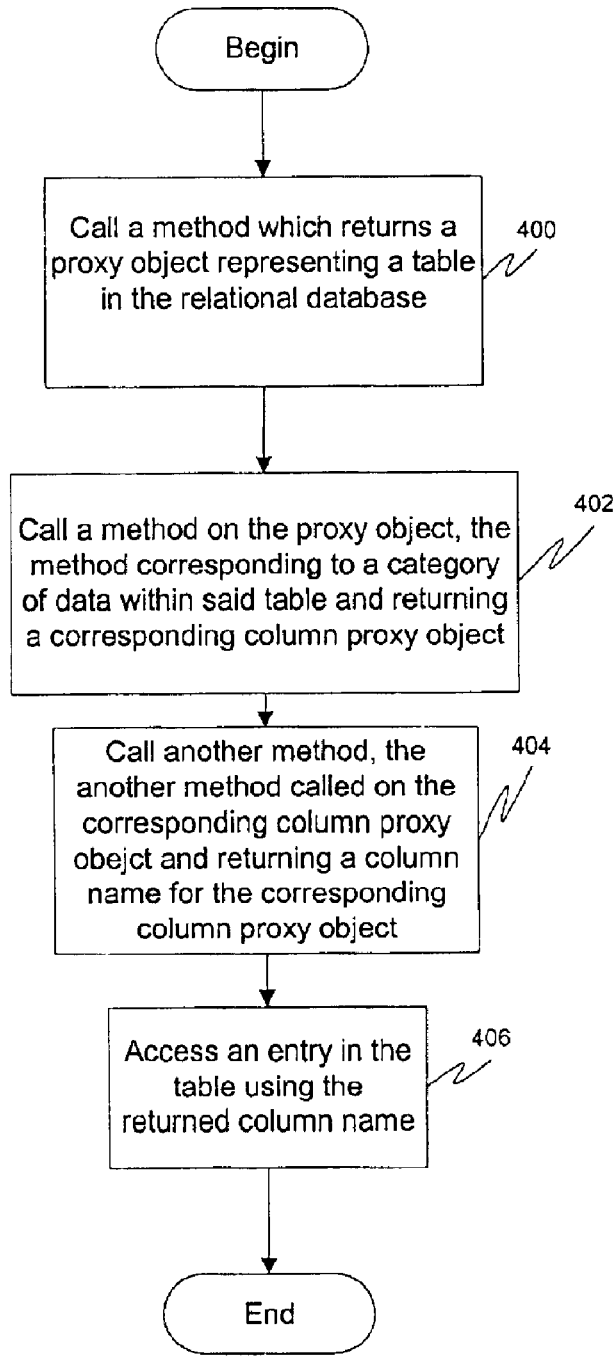
FIG. 4 is a flow diagram illustrating a method for accessing a relational database from within an object oriented language program in accordance with a specific embodiment of the present invention.

FIG. 4 is a flow diagram illustrating a method for accessing a relational database from within an object oriented language program in accordance with a specific embodiment of the present invention. At 400, a method is called, which returns a proxy object representing a table in the relational database. The relational database may be a structured query language database. The method may be maintained by the same provider that maintains the database, possibly even at the same physical location as the database. At 402, a method is called on the proxy object, this method corresponding to a category of data within the table and returning a corresponding column proxy object. At 404, another method is called, this one on the column proxy object and returning the name of the corresponding column proxy object. Finally, at 406, an entry in the table is accessed using the returned column name. The combination of all the column proxy objects and methods makes up a virtual translation library for the column names.

Figure 5:
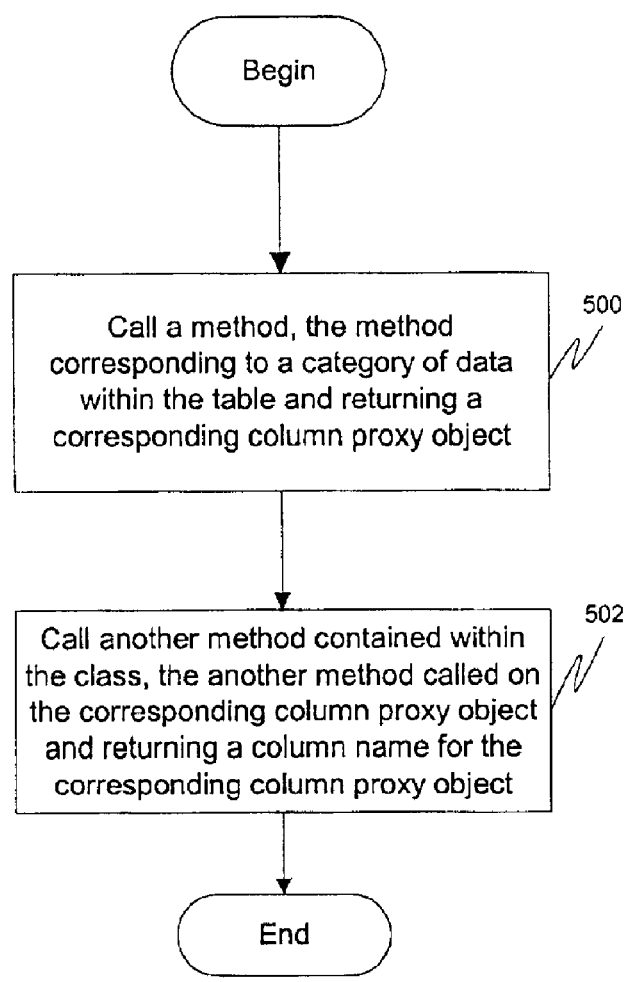
FIG. 5 is a flow diagram illustrating a method for determining a column name of a table contained in a relational database from within an object-oriented language program in accordance with a specific embodiment of the present invention.

FIG. 5 is a flow diagram illustrating a method for determining a column name of a table contained in a relational database from within an object-oriented language program in accordance with a specific embodiment of the present invention. At 500, a method contained may be called on a proxy object, the proxy object representing the table and the method corresponding to a category of data within the table and returning a corresponding column proxy object. The proxy and column proxy object may be recursive, i.e. it may contain methods that invoke other proxy and column proxy objects. The column proxy object may also then be maintained by the same provider that maintains the database, possibly even at the same physical location as the database. At 502, another method is called, this one on the corresponding column proxy object and returning the name of the corresponding column proxy object.

Figure 6:
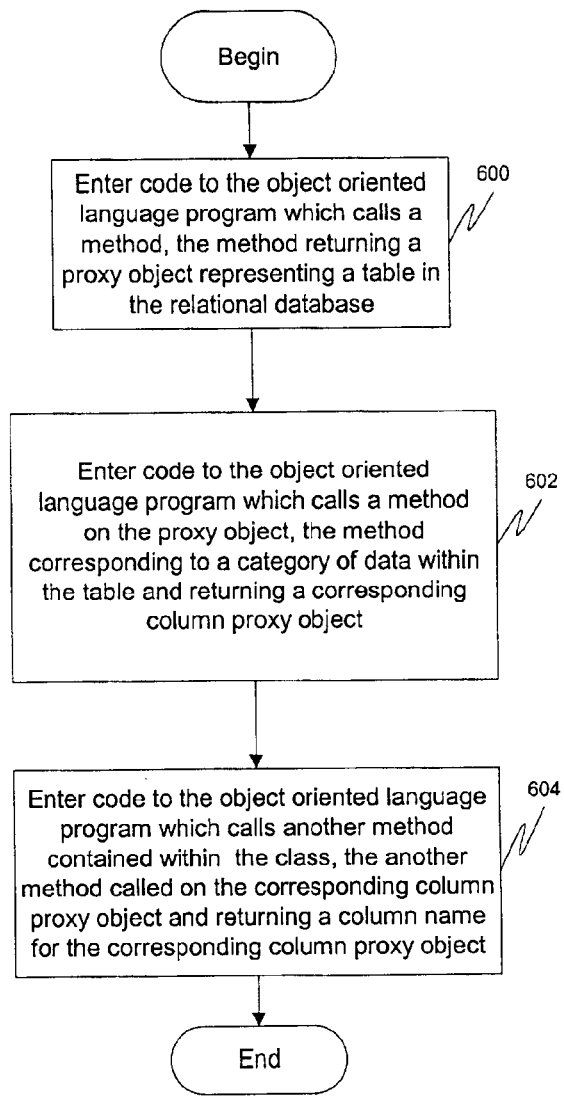
FIG. 6 is a flow diagram illustrating a method for creating an object-oriented language program which accesses a relational database in accordance with a specific embodiment of the present invention.

FIG. 6 is a flow diagram illustrating a method for creating an object oriented language program which accesses a relational database in accordance with a specific embodiment of the present invention. At 600, code is entered to the object oriented language program which calls a method, the method returning a proxy object representing a table in the relational database. The method may be maintained by the same provider that maintains the database, possibly even at the same physical location as the database. The relational database may be a structured query language database and the proxy object may be maintained by the same provider that maintains the relational database. At 602, additional code is entered to the object oriented language program which calls a method on the proxy object, the method corresponding to a category of data within the table and returning a corresponding column proxy object. At 604, code is entered to the object oriented language program which calls another method, this one on the corresponding column proxy object and returning the name of the corresponding column proxy object.

Figure 7:
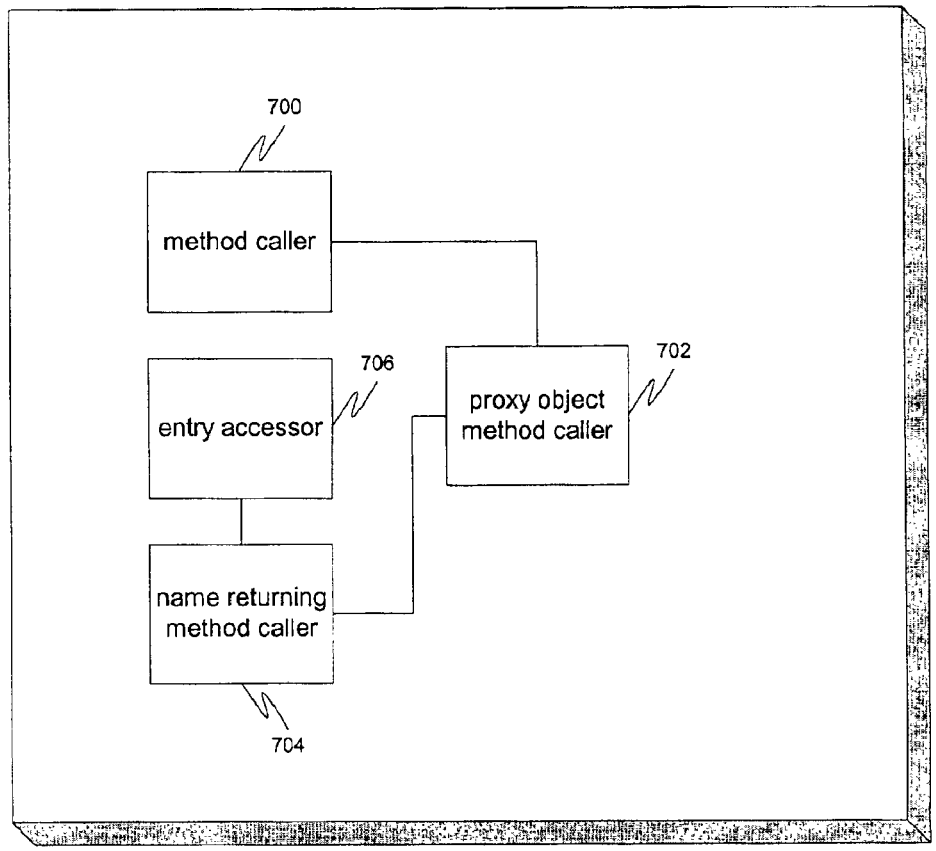
FIG. 7 is a block diagram illustrating an apparatus for accessing a relational database from within an object-oriented language program in accordance with a specific embodiment of the present invention.

FIG. 7 is a block diagram illustrating an apparatus for accessing a relational database from within an object oriented language program in accordance with a specific embodiment of the present invention. A method caller 700 calls a method, the method returning a proxy object representing a table in the relational database. The relational database may be a structured query language database. The method may be maintained by the same provider that maintains the database, possibly even at the same physical location as the database. The proxy object may be recursive, i.e. it may contain methods that invoke other column or proxy objects. The proxy object may also then be maintained by the same provider that maintains the database, possibly even at the same physical location as the database. A proxy object method caller 702 coupled to the method caller 700 calls a method on the proxy object, this method corresponding to a category of data within the table and returning a corresponding column proxy object. A name returning method caller 704 coupled to the proxy object method caller 702 then calls another method, this one on the corresponding column proxy object and returning the name of the corresponding column proxy object. An entry accessor 706 coupled to name returning method caller 704 accesses an entry in the table using the returned column name.

Figure 8:
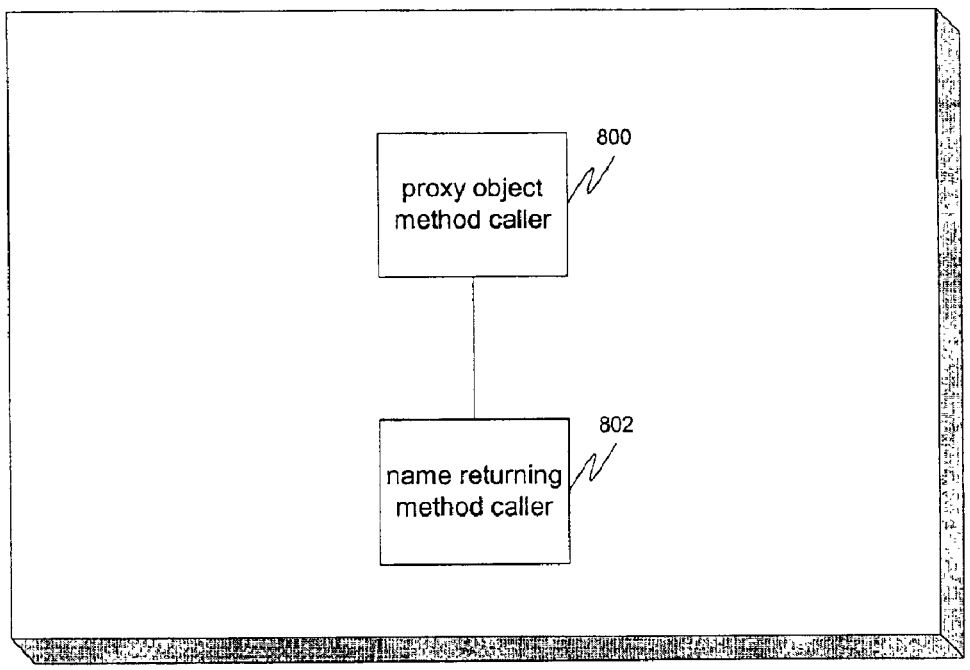
FIG. 8 is a block diagram illustrating an apparatus for determining a column name of a table contained in a relational database from within an object-oriented language program in accordance with a specific embodiment of the present invention.

FIG. 8 is a block diagram illustrating an apparatus for determining a column name of a table contained in a relational database from within an object-oriented language program in accordance with a specific embodiment of the present invention. A proxy object method caller 800 calls a method on a proxy object, the proxy object representing a table in the relational database and the method corresponding to a category of data within the table and returning a corresponding column proxy object. The proxy and column proxy object may be recursive, i.e. they may contain methods that invoke other proxy and column proxy objects. The column proxy object may also then be maintained by the same provider that maintains the database, possibly even at the same physical location as the database. A name returning method caller 802 coupled to the proxy object method caller 800 calls another method contained within the class, this one on the corresponding column proxy object and returning the name of the corresponding column proxy object.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for accessing a relational database from within an object oriented language program comprising:

calling a method, said method returning a proxy object representing a table in the relational database;

calling a method on said proxy object, said method corresponding to a category of data within said table and returning a corresponding column proxy object; and calling another method on said corresponding column proxy object, said another method returning a column name for said corresponding column proxy object.

2. The method of claim 1, wherein the relational database is a structured query language database.

3. The method of claim 1, wherein said proxy object contains references to other proxy objects.

4. The method of claim 1, further including accessing an entry in said table using said returned column name.

5. The method of claim 1, wherein a provider of the database also provides said proxy object.

6. The method of claim 1, wherein a provider of the database also provides said column proxy object.

7. A method for determining a column name of a table contained in a relational database from within an object-oriented language program, comprising:

calling a method on a proxy object, said proxy object representing the table and said method corresponding to a category of data within the table and returning a corresponding column proxy object; and calling another method on said corresponding column proxy object, said another method returning a column name for said corresponding column proxy object.

8. The method of claim 7, wherein the relational database is a structured query language database.

9. The method of claim 7, wherein said proxy object contains references to other proxy objects.

10. The method of claim 7, wherein a provider of the database also provides said proxy object.

11. The method of claim 7, wherein a provider of the database also provides said column proxy object.

12. A method for creating an object oriented language program which accesses a relational database comprising:

entering code to the object oriented language program which calls a method, said method returning a proxy object representing a table in the relational database;

entering code to the object oriented language program which calls a method on said proxy object, said method corresponding to a category of data within said table and returning a corresponding column proxy object; and entering code to the object oriented language program which calls another method on said corresponding column proxy object, said another method returning a column name for said corresponding column proxy object.

13. The method of claim 12, wherein the relational database is a structured query language database.

14. The method of claim 12, wherein a provider of the database also provides said proxy object.

15. The method of claim 12, wherein a provider of the database also provides said column proxy object.

16. An apparatus for accessing a relational database from within an object oriented language program comprising:

a method caller, wherein said method caller calls a method, said method returning a proxy object representing a table in the relational database;

a proxy object method caller coupled to said method caller, wherein said proxy object method caller calls a method on said proxy object, said method corresponding to a category of data within said table and returning a corresponding column proxy object; and a name returning method caller coupled to said proxy object method caller wherein said name returning method callers calls another method on said corresponding column proxy object, said another method returning a column name for said corresponding column proxy object.

17. The apparatus of claim 16, further comprising an entry accessor coupled to said name returning method caller.

18. An apparatus for determining a column name of a table contained in a relational database from within an object oriented language program, comprising:
 a proxy object method caller, wherein said proxy object method caller calls a method on said proxy object, said method corresponding to a category of data within said table and returning a corresponding column proxy object; and
 a name returning method caller coupled to said proxy object method caller wherein said name returning method callers calls another method on said corresponding column proxy object, said another method returning a column name for said corresponding column proxy object.

19. An apparatus for accessing a relational database from within an object oriented language program comprising:
 means for calling a method, said method returning a proxy object representing a table in the relational database;
 means for calling a method on said proxy object, said method corresponding to a category of data within said table and returning a corresponding column proxy object; and
 means for calling another method on said corresponding column proxy object, said another method returning a column name for said corresponding column proxy object.

20. The apparatus of claim 19, wherein the relational database is a structured query language database.

21. The apparatus of claim 19, wherein said proxy object contains references to other proxy objects.

22. The apparatus of claim 19, further including means for accessing an entry in said table using said returned column name.

23. The apparatus of claim 19, wherein a provider of the database also provides said proxy object.

24. The apparatus of claim 19, wherein a provider of the database also provides said column proxy object.

25. An apparatus for determining a column name of a table contained in a relational database from within an object-oriented language program, comprising:
 means for calling a method on a proxy object, said proxy object representing the table and said method corresponding to a category of data within the table and returning a corresponding column proxy object; and
 means for calling another method on said corresponding column proxy object, said another method returning a column name for said corresponding column proxy object.

26. The apparatus of claim 25, wherein the relational database is a structured query language database.

27. The apparatus of claim 25, wherein said proxy object contains references to other column proxy objects.

28. The apparatus of claim 25, wherein a provider of the database also provides said proxy object.

29. The apparatus of claim 25, wherein a provider of the database also provides said column proxy object.

30. An apparatus for creating an object oriented language program which accesses a relational database comprising:
 means for entering code to the object oriented language program which calls a method, said method returning a proxy object for the relational database;
 means for entering code to the object oriented language program which calls a method, said method returning a proxy object representing a table in the relational database;
 means for entering code to the object oriented language program which calls a method on said proxy object, said method corresponding to a category of data within said table and returning a corresponding column proxy object; and
 means for entering code to the object oriented language program which calls another method on said corresponding column proxy object, said another method returning a column name for said corresponding column proxy object.

31. The apparatus of claim 30, wherein the relational database is a structured query language database.

32. The apparatus of claim 30, wherein a provider of the database also provides said proxy object.

33. The apparatus of claim 30, wherein a provider of the database also provides said column proxy object.

34. A program storage device readable by a machine, tangibly embodying a program of instructions executable by the machine to perform a method for accessing a relational database from within an object oriented language program, the method comprising:
 calling a method, said method returning a proxy object representing a table in the relational database;
 calling a method on said proxy object, said method corresponding to a category of data within said table and returning a corresponding column proxy object; and
 calling another method on said corresponding column proxy object, said another method returning a column name for said corresponding column proxy object.

35. A program storage device readable by a machine, tangibly embodying a program of instructions executable by the machine to perform a method for determining a column name of a table contained in a relational database from within an object-oriented language program, the method comprising:
 calling a method on a proxy object, said proxy object representing the table and said method corresponding to a category of data within the table and returning a corresponding column proxy object; and
 calling another method on said corresponding column proxy object, said another method returning a column name for said corresponding column proxy object.

36. A program storage device readable by a machine, tangibly embodying a program of instructions executable by the machine to perform a method for creating an object oriented language program which accesses a relational database, the method comprising:
 entering code to the object oriented language program which calls a method, said method returning a proxy object representing a table in the relational database;
 entering code to the object oriented language program which calls a method on said proxy object, said method corresponding to a category of data within said table and returning a corresponding column proxy object; and
 entering code to the object oriented language program which calls another method on said corresponding column proxy object, said another method returning a column name for said corresponding column proxy object.

\* \* \* \* \*